United States Patent [19]
Odegard et al.

[11] Patent Number: 5,969,959
[45] Date of Patent: Oct. 19, 1999

[54] CONVERTER CIRCUIT ARRANGEMENT WITH PROTECTION CIRCUIT

[75] Inventors: Björn Odegard, Turgi, Switzerland; Jochen Rees, Waldshut-Tiengen, Germany

[73] Assignee: Asea Brown Boveri AG, Baden, Switzerland

[21] Appl. No.: 09/135,172

[22] Filed: Aug. 18, 1998

[30] Foreign Application Priority Data

Aug. 25, 1997 [DE] Germany ............................ 197 36 904

[51] Int. Cl.⁶ .......................... H02M 5/45; H02M 7/155; H02H 5/00
[52] U.S. Cl. ............................. 363/51; 363/37; 363/128; 363/135
[58] Field of Search .................................. 363/37, 39, 51, 363/68, 54, 57, 128, 135, 85, 96

[56] References Cited

FOREIGN PATENT DOCUMENTS

| | | | |
|---|---|---|---|
| 0034845 | 9/1981 | European Pat. Off. | H02H 7/125 |
| 1613839 | 12/1970 | Germany | H02H 7/14 |
| 2058116 | 6/1971 | Germany | H01T 3/00 |
| 4441279C1 | 9/1995 | Germany | H02H 9/02 |
| 19500125A1 | 7/1996 | Germany | H02H 9/02 |

*Primary Examiner*—Peter S. Wong
*Assistant Examiner*—Bao Q. Vu
*Attorney, Agent, or Firm*—Burns, Doane, Swecker & Mathis, L.L.P.

[57] ABSTRACT

A converter circuit arrangement is specified having a rectifier, an intermediate circuit and an invertor connected thereto. In order to protect the circuit against failures and overvoltage, a protection circuit which comprises, in particular, varistors is connected between the two partial rectifiers of the rectifier.

5 Claims, 1 Drawing Sheet

CONVERTER CIRCUIT ARRANGEMENT WITH PROTECTION CIRCUIT

BACKGROUND OF THE INVENTION

1. Field of the Invention

The invention relates to the field of power electronics. It is based on a converter circuit arrangement having a rectifier, in particular with a 12-pulse topology, and an invertor which is connected downstream via an intermediate circuit, as claimed in the precharacterizing clause of the first claim.

2. Discussion of Background

A converter circuit arrangement of this generic type comprises a rectifier which has, in particular, a 12-pulse topology and supplies a DC intermediate circuit. The rectifier comprises a first partial rectifier which is connected to a star circuit of an AC power supply, and a second partial rectifier which is connected to a delta circuit of the AC power supply. A DC intermediate circuit which supplies, for example, a downstream converter, can be connected to the partial rectifiers. The use of the 12-pulse topology results in a DC voltage which is distinguished by extremely low ripple. Connected downstream of the DC intermediate circuit is an invertor which, for example, may be in the form of a three-point invertor. The components in this circuit arrangement must be protected against various failures, in the rectifiers, the power supply or the invertor. In particular, the intermediate circuit capacitors must not be overcharged. If a semiconductor in the rectifiers fails, consequential damage must be limited to a minimum. The same applies to failure of an invertor semiconductor. Finally, it should also be possible to cope with unusually high power supply overvoltages without any damage.

SUMMARY OF THE INVENTION

Accordingly, one object of the invention is to provide a novel converter circuit arrangement which can be reliably protected against the rectifier, power supply or invertor failures mentioned above. This object is achieved by the features in the independent claim.

The essence of the invention is thus for a protection circuit to be connected between the two partial rectifiers of the rectifier and a mid-potential in the DC intermediate circuit.

One embodiment is distinguished by the fact that the protection circuit has voltage limiter elements, in particular in the form of varistors or related elements. Some of the voltage limiter elements can also be switched on and off.

Further advantageous embodiments result from the corresponding dependent claims.

BRIEF DESCRIPTION OF THE DRAWINGS

A more complete appreciation of the invention and many of the attendant advantages thereof will be readily obtained as the same becomes better understood by reference of the following detailed description when considered in connection with the accompanying drawings, wherein.

Figure 1:
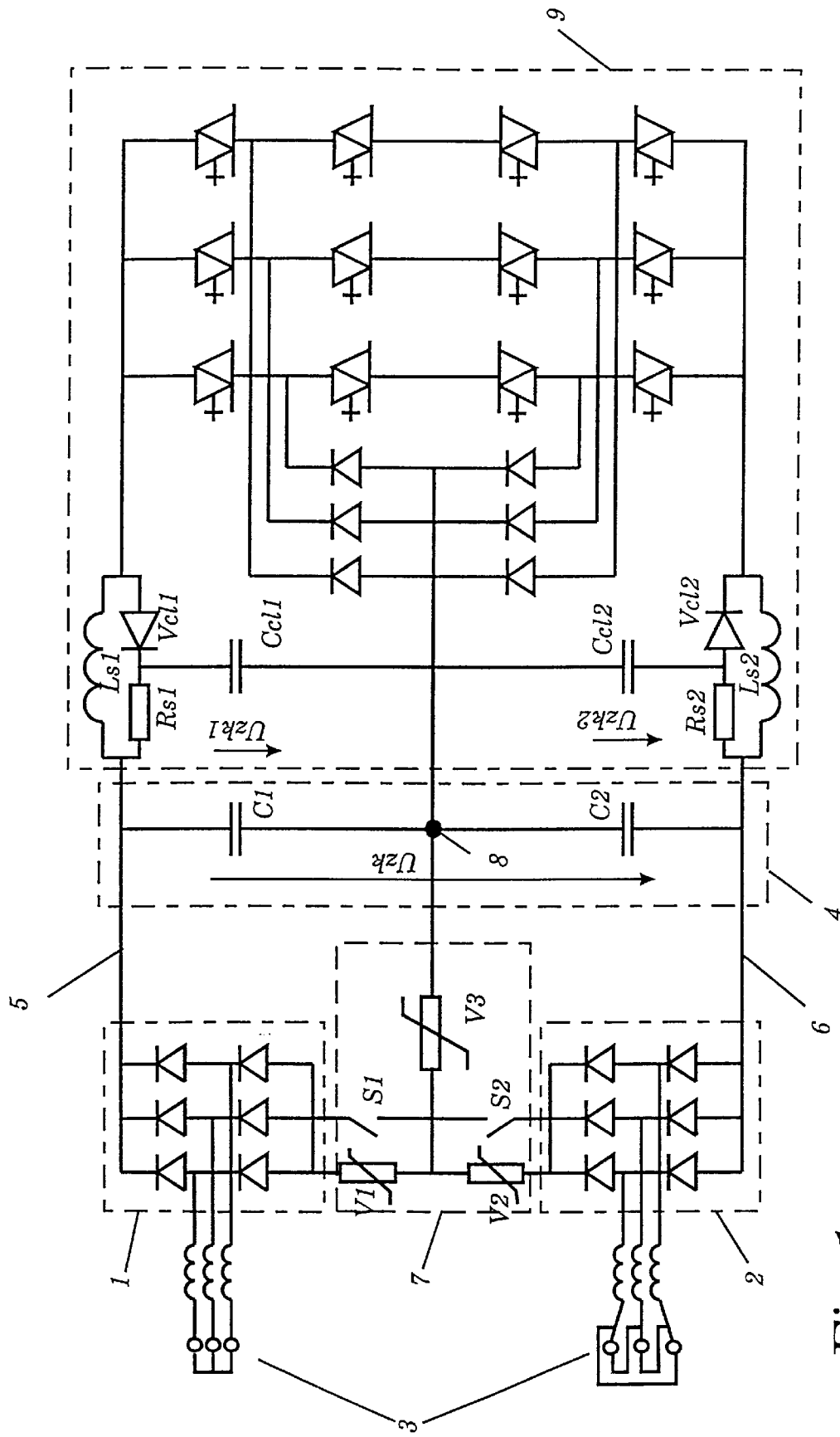
FIG. 1 shows a circuit diagram according to the invention.

The reference designations used in the drawings, and their meanings, are listed in summary form in the List of Designations.

DESCRIPTION OF THE PREFERRED EMBODIMENTS

Referring now to the drawings, wherein like reference numerals designate identical or corresponding parts throughout the several views, FIG. 1 shows a circuit diagram of an exemplary embodiment of the invention. A three-point invertor 9 is illustrated on the right-hand side of the figure and is supplied from a 12-pulse rectifier 1, 2 via an intermediate circuit 4 having a positive connection 5, a negative connection 6 and a mid-potential connection 8. The intermediate circuit 4 comprises, in particular, a capacitor bank C1, C2, and the rectifier 9 is protected by a circuitry network against excessively high current and voltage flanks. The rectifier comprises two partial rectifiers 1 and 2, the first of which is connected to a star circuit of an AC power supply 3, and the second of which is connected to a delta circuit of the AC power supply. The rectifier thus has the known 12-pulse topology. In addition to the semiconductor switches, for example GTOs, the invertor 9 comprises a circuitry network having two current limiting inductors Ls1, Ls2, two resistors Rs1, Rs2, two circuitry diodes Vcl1, Vcl2 and two circuitry capacitors Ccl1, Ccl2.

According to the invention, a protection circuit 7 is now connected between the two partial rectifiers 1 and 2 and the mid-potential connection 8. The protection circuit comprises voltage limiter elements V1, V2, V3, in particular in the form of varistors. The first voltage limiter element V1 is connected on one side to the first partial rectifier 1 and to a common node 7. The second voltage limiter element V2 is connected on one side to the second partial rectifier 2 and to the common node 7. The third voltage limiter element V3 is connected to the mid-potential connection 8 and to the common node 7. The first and second voltage limiter elements 1 and 2 can be designed such that they can be switched on and off by, for example, connecting a switch S1 or S2 in parallel with them.

The circuit operates as follows:

1. Intermediate Circuit Charging Process

The protection circuit reliably prevents undesirable overcharging of the capacitor bank C1, C2 in the DC intermediate circuit 4. The charging process may take place as follows:

The power supply main switch (not illustrated) is closed. The switches S1 and S2 remain open until the intermediate circuit voltage Uzk has reached the steady state. This is considerably less than the no-load voltage Uzk0, provided the voltage limiters V1 and V2 are designed correctly.

The switch S1 is closed. The intermediate circuit voltage Uzk1 increases, but does not reach the no-load voltage Uzk10 since the voltage limiter V3 has a limiting effect.

S1 is opened and S2 is closed. The intermediate circuit voltage Uzk2 increases but does not reach the no-load voltage Uzk20 since the voltage limiter V3 has a limiting effect.

S1 is closed again. The intermediate circuit voltage overshoots only slightly, by the magnitude of the threshold voltage, provided V3 is appropriately designed.

2. Failure of a Rectifier Diode

If a rectifier diode fails, the protection circuit prevents hazardous consequential failures, in that the limiter V3 limits the short-circuit current arising from this. This prevents the full load interval of the failed semiconductor from being exceeded. In order to avoid consequential failures in the adjacent rectifier, the parasitic inductances in the short-circuit paths must be matched to one another. The protection function is ensured without the failure being detected by the regulator or controller.

3. Semiconductor Failure in the Invertor

In the event of a semiconductor failure in the invertor, which can lead to a short circuit in one half of the intermediate circuit 4 (for example C1), the protection circuit prevents dangerous consequential failures. This is done by the switches S1 and S2 being opened immediately after the failure is detected. This has to be done within a few microseconds of the time of the failure. Once the relevant half of the intermediate circuit capacitor, for example, C1, has discharged, V1 offers a negative voltage for the current to build up in the current limiting inductor Ls1. By appropriately designing V1, it is possible to exceed the full load interval of all semiconductors involved in the short circuit.

In this case, there is now a short circuit in the invertor 9. In consequence, the power supply 3 supplies a short-circuit current via the partial rectifier 1 into the short-circuit path until the power supply fuse blows or the main switch opens. In order to reduce the requirements on the energy absorption capacity of the limiter V1, the switches S1 and S2 may be closed again once the oscillations between C1 and Ls1 have decayed.

Analogous analyses apply, of course, to a failure in the area of C2 and to a short circuit of the two intermediate circuit capacitors C1 and C2. In the last case, both limiters V1 and V2 come into action.

4. Power Supply Overvoltages which Unacceptably Overload the Intermediate Circuit In the event of an intermediate circuit overvoltage, the switches S1 and S2 are closed. This effectively prevents any dangerous overloading of the intermediate circuit even in the event of extraordinarily high power supply overvoltages.

Overall, the invention ensures that a converter circuit arrangement operates reliably. The required protection circuit is furthermore, of simple design and allows numerous other circuitry elements to be saved, in particular the rectifier.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A converter circuit comprising
    a rectifier (1, 2), in particular having a 12-pulse topology, having a first partial rectifier (1) and having a second partial rectifier (1) which are connected to an AC power supply (3) and supply a DC intermediate circuit (4), the first partial rectifier (1) being connected to a positive connection (5) of the DC intermediate circuit (4), and the second partial rectifier (2) being connected to a negative connection (6) of the DC intermediate circuit (4),
    an invertor (9) which is connected to the DC intermediate circuit (4);
wherein a protection circuit (7) is connected between the two partial rectifiers (1, 2) and a mid-potential (8) of the DC intermediate circuit (4).

2. The circuit arrangement as claimed in claim 1, wherein the protection circuit (7) comprises first, second and third voltage limiter elements (V1, V2, V3), the first voltage limiter elements (V1) being connected on one side to the first partial rectifier (1), the second voltage limiter elements (V2) being connected on one side to the second partial rectifier (2), the third voltage limiter elements (V3) being connected on one side to the mid-potential (8), and all three voltage limiter elements being connected on the other side to a common node (10).

3. The circuit arrangement as claimed in claim 2, wherein the first and second voltage limiter elements (V1, V2) can be switched on and off.

4. The circuit arrangement as claimed in claim 2 wherein the voltage limiter elements (V1, V2, V3) comprise varistors or other elements having a related current/voltage characteristic.

5. The circuit arrangement as claimed in claim 4, wherein switches (S1, S2) are arranged in parallel with the varistors of the first and second voltage limiter elements (V1, V2).

* * * * *